June 21, 1955  W. A. MEIGHAN ET AL  2,710,998

SLOTTED FLANGE TENSIONING AND JOINING DEVICE FOR STRAP ENDS

Original Filed Sept. 15, 1950

INVENTORS
William A. Meighan
BY and Tirey L. Hume

Atty.

United States Patent Office

2,710,998
Patented June 21, 1955

2,710,998

SLOTTED FLANGE TENSIONING AND JOINING DEVICE FOR STRAP ENDS

William A. Meighan, Oswego, and Tirey L. Hume, Portland, Oreg.

Original application September 15, 1950, Serial No. 184,946, now Patent No. 2,642,639, dated June 23, 1953. Divided and this application September 28, 1951, Serial No. 248,854

5 Claims. (Cl. 24—68)

This invention relates to a device for securing the ends of a flexible metal cargo strap in overlying relationship to form a closed loop, applying a tension to the looped strap, and detachably locking the tensioned strap against inadvertent longitudinal movement of one overlying end relative to the other. The subject matter of this invention is a division of the subject matter disclosed in our copending application bearing Serial Number 184,946, filed September 15, 1950 and entitled Flange Tensioning and Joining Device for Strap Ends, now Patent Number 2,642,639 dated June 23, 1953.

The conventional metal cargo strap is a flexible band of steel approximately 2 inches in width and $1/16$ to $3/32$ inch thick. In use, it may serve a function similar to a rope or wire rope to lash one or more pieces of cargo to a deck, hold or carrier. On the other hand, it may be employed aboard a cargo vessel which is carrying a fungible cargo. In the latter instance, the hold of the ship is divided into two or more small semi-open compartments by constructing a temporary fore and aft bulkhead along the keel line of the hold. This baffle conventionally is formed from timbers which are set on end and secured to the hold ribs with the cargo straps. Thereafter, the fungible cargo is discharged into the hold over the baffle. The timbers and straps divide the fungible mass and serve as buffers or baffles to inhibit lateral shifting of the cargo while the vessel is under way.

Whether a flexible cargo strap is employed in conjunction with concentrated pieces of freight or cargo or is used in conjunction with a fungible cargo, some device must be provided to tension and secure or lock the strap ends in place. Our invention is directed toward an improvement in such a tension and locking device. Accordingly, we provide a cylindrical mandrel carrying a pair of spaced circular flanges having aligned key-hole shaped keeper holes piercing the outer peripheries of the flanges. The mandrel, in turn, is slotted intermediate the flanges to thread the ends of the metal cargo strap therethrough and, in configuration, the mandrel is non-circular outboard of the flanges to define two tool engaging peripheries. After threading the ends of the strap through the slots in the mandrel, the strap is wound about the mandrel by applying a pair of wrenches to the tool engaging peripheries and turning the same. The aligned holes of this invention more particularly are keyhole shaped and open radially to the periphery of the flanges to receive a slab-sided keeper pin in a manner more particularly to be explained hereinafter. Such a keyhole shape and such a keeper pin are capable of locking the strap in any desired state of tension yet the entire securing device may be used repeatedly without destroying the device itself and the strap may be loosened or tightened at any time as desired.

One object of our invention is to provide a coacting mandrel, flange, and keeper pin construction which allows the pin to pass radially into a keyhole shaped keeper hole, yet which retains and locks the keeper pin once it is in place by rotating the pin substantially 90°.

Another object of our invention is to provide a cargo strap joining and tensioning device which is capable of repeated use, and which may be retightened and relocked to take up any slack which may develop due to a shift in the cargo or the article secured.

These and further objects and advantages of our invention will appear from the following detailed description taken in conjunction with the accompanying drawings, in which.

Figure 1:
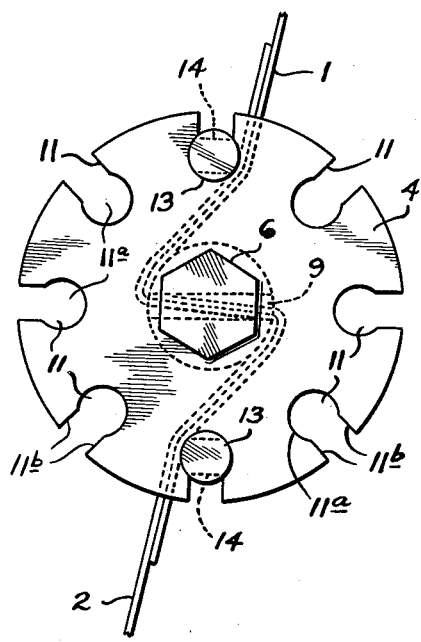
Figures 1 and 2 are related end and plan views, respectively, showing the relationship of the keyhole shaped keeper holes to the mandrel and circular flanges.
Figure 2:
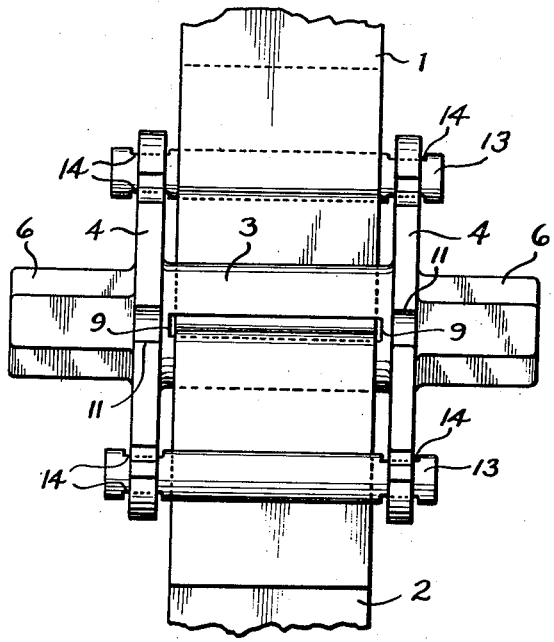

The instant invention is adapted to secure the respective ends of 1 and 2 of a flexible metal cargo strap in overlying relationship, as shown by the full and dashed lines in Figures 1 and 2. The principal joining and winding member therefore is an elongate cylindrical mandrel 3 which carries a pair of spaced circular, plate-like flanges 4 intermediate the ends thereof.

As shown, the flanges 4 are formed integral with the mandrel 3 and the latter carries a non-circular tool engaging periphery 6 at each end thereof. Thus, the non-circular peripheries 6 are adapted to receive one or a pair of tensioning tools such as large bell crank levers, socket wrenches, or Crescent wrenches to rotate the mandrel.

The central section of the mandrel 3, intermediate the flanges 4, carries a slotted keyway 9 having a width exceeding twice the thickness of the aforementioned strap so that strap ends 1 and 2 may be threaded therethrough in overlying relationship. For example, the keyway 9 may be made $2 1/8$ inches wide and $1/4$ inch deep if a flexible metal cargo strap $2 \times 1/16$ inches is to be accommodated.

To lock the ends of the flexible strap against inadvertent longitudinal movement once the desired tension has been attained by rotating the mandrel, the peripheral portions of each flange 4 are provided with one or more spaced keeper holes 11. As shown, each of these keeper holes 11 is keyhole shaped radially with a circular portion 11a lying toward the central portion of the flange and with a reduced straight-sided portion 11b opening outwardly to the periphery of the flange.

Figure 3:
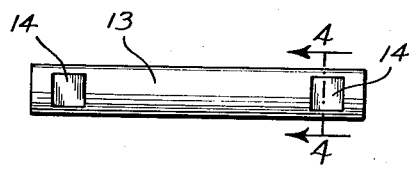
Figure 3 is a side view of the slab-sided keeper pin per se.
Figure 4:
Figure 4 is an end section, taken substantially on the line 4—4 of Figure 3, more particularly indicating the slabbed off or reduced portions of the keeper pin.

Turning now to Figures 3 and 4, we have shown our novel keeper pin 13. This keeper pin is cylindrical in cross section throughout a majority of its length and is provided with two opposed slab-sided or reduced portions 14 adjacent each end thereof. As best indicated in Figures 1 and 4, the slab-sided portions 14 give to the keeper pin a thickness, at that reduced point, which is mated to and substantially equal to the width of the straight-sided portion 11b of the keeper hole 11. Thus, the straight-sided portion 11b slidably will pass the slab-sided portion 14 of the keeper pin but will retain the pin against inadvertent radial displacement when the pin is rotated 90° within the circular portion 11a. Further, as can be seen in Figures 1 and 2, the ends of the keeper pin 13 have a diameter no greater than the diameter of the keeper hole circular portions 11a in order that the keeper pins may be adjusted or removed by striking the end thereof with a sharp blow. Such a sharp blow slidably will move the pin longitudinally of the length thereof out of the circular portion and free the strap ends when desired.

In the operation of our invention, the flexible strap ends 1 and 2 are threaded through the square eyes in a pair of ship clamps or cleats secured to a hold rib or the deck, are stretched laterally across the hold, and are threaded through the eyes in a piece of cargo or around a perpendicular timber baffle. Thereafter, these ends are threaded through the slotted keyway 9 in the mandrel 3 and a tensioning tool is applied to one or both ends of the tool engaging peripheries 6. The mandrel is then rotated by these tensioning tools so the strap winds about the periphery of the mandrel 3 until the proper tension is produced in the strap. Thereafter, one of the cylindrical keeper pins 13 is inserted through a companion pair of the aligned keyhole shaped keeper holes 11 and the tension is slacked off lightly to bring the pin into engagement and contact with one surface of the strap. This engagement locks the strap and prevents the mandrel from unwinding or inadvertently from allowing more slack to develop. With our novel keeper pin construction, the insertion of the pin is accomplished by first turning the slab-sided portions 14 so they mate with the straight-sided portions 11b of the keeper hole and, thereafter, by pushing the pin radially into the circular portions 11a. Once in place, the keeper pin 13 is rotated approximately 90° to lock it in place as shown in Figure 1.

In accord with the objects of our invention, we have provided a slotted flange tensioning and joining device with which a cargo quickly and effectively may be secured against relative movement. Further, the cargo quickly may be released by driving our novel keeper pin from the hole by striking a longitudinal blow upon the end thereof. Such a quick release allows the cargo to be unloaded quickly. On the other hand, the tension on the flexible metal cargo strap may be taken up or backed off easily by applying tensioning tools to the non-circular peripheries 6, by rotating the keeper pin 13 once more to bring the slab-sided portions thereof into alignment with the straight-sides 11b, and by seating the pin in a different set of holes. Thus, the slotted tensioning and securing devices of our invention may be locked in any desired state of tension and may be adjusted after a period of use, yet the securing device itself may be used repeatedly, without destruction, over a long period of time.

We claim:

1. A device for securing the ends of a flexible strap in overlying relationship, applying a tension to the strap, and detachably locking the tensioned strap against inadvertent movement, said device comprising an elongate mandrel terminating at each end in an integral non-circular tool engaging periphery adapted to receive a tensioning tool, a pair of spaced circular flange plates carried one at each end of said mandrel and operatively retained against rotation relative thereto, a slotted keyway piercing said mandrel intermediate said flange plates slidably to receive the ends of the strap in overlying relationship, a plurality of laterally aligned keeper holes piercing the outer periphery of said flanges, each said keeper hole being keyhole shaped radially with a circular portion lying toward the central portion of the flange and a reduced straight-sided portion opening outwardly to the periphery of the flange, and an elongate keeper pin adapted to bear against one surface of said overlying strap ends to lock the strap against movement relative to the pin, said keeper pin having two opposed slab-sided portions adjacent each end thereof, each such slab-sided portion having a thickness substantially equal to the width of said keeper hole reduced portion slidably to pass the slab-sided portion of the pin laterally therethrough but to retain the pin against radial displacement when the pin is rotated.

2. A device for securing the ends of a flexible metal cargo strap in overlying relationship to form a closed loop, applying a tension to the looped strap, and detachably locking the tensioned strap against inadvertent longitudinal movement of one overlying end relative to the other, said device comprising an elongate cylindrical mandrel terminating at each end in an integral non-circular tool engaging periphery which is adapted to receive a complementary non-circular tensioning tool, a pair of spaced circular flange plates carried one at each end of the cylindrical portion of said mandrel and operatively retained against rotation relative thereto, a slotted keyway piercing the medial portion of said mandrel intermediate said flange plates and having a slot width exceeding twice the thickness of said flexible strap slidably to receive the ends of the strap in overlying relationship, a plurality of mated and laterally aligned keeper holes piercing the outer periphery of said flanges, each said keeper hole being keyhole shaped radially with a circular portion lying toward the central portion of the flange and a reduced straight-sided portion opening outwardly to the periphery of the flange, and an elongate cylindrical keeper pin adapted to bear against one surface of said overlying strap ends to lock the strap against movement relative to the pin, said keeper pin having two opposed slab-sided portions adjacent each end thereof, each such slab-sided portion having a thickness mated to and substantially equal to the width of said keeper hole reduced portion slidably to pass the slab-sided portion of the pin laterally therethrough but to retain the pin against radial displacement and in locking contact with said strap when the pin is rotated 90° within said keeper hole circular portion, at least one terminal end of said keeper pin having a diameter no greater than the diameter of said keyhole circular portion to accommodate slidable, longitudinal removal of the pin from the keyhole.

3. A device for locking the ends of a flexible strap in overlying relationship and applying tension thereto, comprising an elongate mandrel carrying a pair of spaced flanges adjacent the ends thereof, and a slotted keyway in said mandrel for threading the ends of a strap therethrough, the peripheries of said flanges carrying a plurality of aligned keeper holes, and an elongate keeper pin removably retained in one pair of said keeper holes, each said keeper pin carrying slab-sided portions adjacent the ends thereof and each said keeper hole corresponding in peripheral outline to the cross section of a keeper pin adjacent one of the slab-sided portions of said keeper pin, and having a reduced portion open to the flange periphery and complementary to said slab-sided portions for retaining the keeper pin after passing the slab-sided portion.

4. A device for locking the ends of a flexible strap in overlying relationship and applying tension thereto, comprising an elongate mandrel carrying a pair of spaced flanges adjacent the ends thereof, one or more elongate keeper pins, and a slotted keyway in said mandrel for threading the ends of a strap therethrough in overlying relationship, the peripheries of said flanges carrying a plurality of aligned keeper holes for removably retaining elongate keeper pins, each said keeper pin carrying slab-sided portions adjacent the ends thereof and each said keeper hole corresponding in peripheral outline to the cross section of a keeper pin adjacent one of the slab-sided portions of said keeper pin, and having a reduced portion open to the flange periphery and complementary to said slab-sided portions for retaining the keeper pin after passing the slab-sided portion, at least one terminal end of said keeper pin having a diameter no greater than the diameter of said keeper holes to accommodate longitudinal removal of the pin, while under tension, by striking a blow on the end thereof.

5. A device for locking the ends of a flexible strap in overlying relationship and applying tension thereto, comprising an elongate mandrel carrying a pair of spaced flanges adjacent the ends thereof, a slotted keyway in said mandrel for threading the ends of a strap therethrough, each said flange carrying one of a pair of aligned keeper holes having a reduced portion open to the flange periphery, and an elongate keeper pin of greater diameter than the width of said reduced portion of the keeper hole, said pin having nonconcentric reduced portions for passing the pin radially through the reduced portions of said keeper holes and retaining the pin in said aligned keeper holes.

References Cited in the file of this patent

UNITED STATES PATENTS

| | | |
|---|---|---|
| 294,716 | Amis | Mar. 4, 1884 |
| 1,024,830 | Cook | Apr. 30, 1912 |
| 1,403,042 | Leonard | Jan. 10, 1922 |
| 2,642,639 | Meighan et al. | June 23, 1953 |